(12) United States Patent
Choi

(10) Patent No.: US 11,557,819 B2
(45) Date of Patent: Jan. 17, 2023

(54) BATTERY PACK AND LABEL ATTACHING METHOD THEREOF

(71) Applicant: SAMSUNG SDI CO., LTD., Yongin-si (KR)

(72) Inventor: Bum Kuk Choi, Yongin-si (KR)

(73) Assignee: SAMSUNG SDI CO., LTD., Yongin-si (KR)

( * ) Notice: Subject to any disclaimer, the term of this patent is extended or adjusted under 35 U.S.C. 154(b) by 266 days.

(21) Appl. No.: 16/754,906

(22) PCT Filed: Oct. 11, 2018

(86) PCT No.: PCT/KR2018/011958
§ 371 (c)(1),
(2) Date: Apr. 9, 2020

(87) PCT Pub. No.: WO2019/146874
PCT Pub. Date: Aug. 1, 2019

(65) Prior Publication Data
US 2021/0203048 A1   Jul. 1, 2021

(30) Foreign Application Priority Data

Jan. 26, 2018   (KR) .................... 10-2018-0010109

(51) Int. Cl.
*H01M 50/598* (2021.01)
*H01M 50/103* (2021.01)
(Continued)

(52) U.S. Cl.
CPC ............ *H01M 50/598* (2021.01); *B65C 1/02* (2013.01); *C09J 167/02* (2013.01); *C09J 183/04* (2013.01);
(Continued)

(58) Field of Classification Search
CPC ............ H01M 50/598; H01M 50/103; H01M 10/0525; H01M 10/42–4257;
(Continued)

(56) References Cited

U.S. PATENT DOCUMENTS 5,240,789 A   8/1993   Breen et al.
5,368,953 A   11/1994   Zaborney et al.
(Continued)

FOREIGN PATENT DOCUMENTS

CN   101779309 A   7/2010
JP   10-058488 A   3/1998
(Continued)

OTHER PUBLICATIONS

Chinese Office action dated Dec. 21, 2021.
(Continued)

*Primary Examiner* — Karie O'Neill Apicella
(74) *Attorney, Agent, or Firm* — Lee IP Law, P.C.

(57) ABSTRACT

The present invention relates to a battery pack to which a thin-film label can be easily attached, and a label attaching method thereof. Disclosed in one embodiment is a battery pack comprising: a battery cell having an electrode assembly accommodated in a case; and an external film, which has a label attached to at least one surface of the case and directly attached to the case, a step difference compensation tape attached to the upper surface of the label and positioned on one side of the label, and a protective film attached to the upper surface of the label and extending to the upper part of the step difference compensation tape, wherein the protective film is attached so as to be detachable from the label.

4 Claims, 5 Drawing Sheets

(51) Int. Cl.
  *B65C 1/02* (2006.01)
  *C09J 167/02* (2006.01)
  *C09J 183/04* (2006.01)
  *H01M 10/0525* (2010.01)
  *H01M 10/42* (2006.01)

(52) U.S. Cl.
  CPC ... *H01M 10/0525* (2013.01); *H01M 10/4257* (2013.01); *H01M 50/103* (2021.01); *H01M 2010/4278* (2013.01)

(58) Field of Classification Search
  CPC . H01M 2010/4278; B65C 1/02; C09J 167/02; C09J 183/04
  See application file for complete search history.

(56) References Cited

U.S. PATENT DOCUMENTS

| | | | |
|---|---|---|---|
| 8,252,456 B2 | 8/2012 | Mushiga et al. | |
| 2009/0041992 A1* | 2/2009 | Umeda | C09J 7/29 428/200 |
| 2011/0059338 A1 | 3/2011 | Baek et al. | |
| 2011/0236746 A1 | 9/2011 | Mushiga et al. | |
| 2013/0224530 A1 | 8/2013 | Baek et al. | |
| 2016/0372701 A1 | 12/2016 | Kwon et al. | |

FOREIGN PATENT DOCUMENTS

| | | |
|---|---|---|
| JP | H10-194244 A | 7/1998 |
| KR | 10-2011-0107528 A | 10/2011 |
| KR | 10-1313324 B2 | 9/2013 |
| KR | 10-2014-0061150 A | 5/2014 |
| KR | 10-1504275 B1 | 3/2015 |
| KR | 10-1638472 B2 | 7/2016 |
| KR | 10-2017-0000030 A | 1/2017 |
| KR | 10-2017-0076053 A | 7/2017 |

OTHER PUBLICATIONS

Extended European Search Report dated Jun. 17, 2021.
International Search Report dated Jan. 2, 2019 for PCT/KR2018/011958.

\* cited by examiner

BATTERY PACK AND LABEL ATTACHING METHOD THEREOF

CROSS REFERENCE TO RELATED APPLICATIONS

This is the U.S. national phase application based on PCT Application No. PCT/KR2018/011958, filed Oct. 11, 2018, which is based on Korean Patent Application No. 10-2018-0010109, filed Jan. 26, 2018, the entire contents of all of which are hereby incorporated by reference.

TECHNICAL FIELD

The present disclosure relates to a battery pack and a label attaching method thereof.

BACKGROUND ART

Unlike a primary battery which is not rechargeable, a secondary battery is capable of being charged and discharged. A low-capacity secondary battery composed of a single battery cell packaged in the form of a pack is used for various small portable electronic devices such as cellular phones and camcorders. A high-capacity secondary battery in which a plurality of battery cells are connected to each other in a pack structure is widely used as a power source for driving a motor of a hybrid car.

Secondary batteries are manufactured in various shapes and are generally classified as a pouch type battery, a cylindrical battery or a prismatic battery. A secondary battery may be constructed by accommodating an electrode assembly having a separator as an insulator between positive and negative electrode plates and an electrolyte in a case. In addition, the secondary battery may have a label attached to its outer surface, the label including various kinds of pieces of information (for example, manufacturer, model name, product number, a variety of standards or quality indications, usage precautions, and the like) printed thereon. Meanwhile, the label having a small thickness may increase the likelihood of defect occurrences, and the label having a large thickness may make it difficult to achieve a compact secondary battery.

DESCRIPTION OF EMBODIMENTS

Technical Problem

The present disclosure provides a battery pack, to which a thin-film label can be easily attached, and a label attaching method thereof.

Solution to Problem

According to an aspect of the present disclosure, provided is a battery pack including a battery cell having an electrode assembly accommodated in a case, and an external film, which has a label attached to at least one surface of the case and directly attached to the case, a step difference compensation tape attached to the upper surface of the label and positioned on one side of the label, and a protective film attached to the upper surface of the label and extending to the upper part of the step difference compensation tape, and the protective film may be attached so as to be detachable from the label.

The protective film may include a first protective film located on a surface of the label where the step difference compensation tape is not positioned, the first protective film having the same height as the step difference compensation tape; and a second protective film located on the first protective film and extending to the upper part of the step difference compensation tape.

A first adhesive may be located between the label and the case, a second adhesive having a smaller adhesion force than the first adhesive may be located between the first protective film and the label, a third adhesive having a larger adhesion force than the second adhesive may be located between the second protective film and the first protective film, and the second adhesive may be located between the second protective film and the step difference compensation tape.

The first adhesive and the third adhesive may be PET adhesives, and the second adhesive may be a silicon adhesive.

The adhesion force of the second adhesive may be $1/60$ to $1/20$ that of the first or third adhesive.

The battery pack may further include an external cover coupled to the battery cell and having a circuit structure embedded at a portion inside the external cover, the external cover may be coupled to be mounted on the upper surface of the label, the circuit structure may be positioned next to the step difference compensation tape, and the circuit structure and the step difference compensation tape have the same height.

According to an aspect of the present disclosure, provided is a label attaching method of a battery pack, including the steps of: preparing an external film having a label, a step difference compensation tape attached to the upper surface of the label and positioned on one side of the label, and a protective film attached to the upper surface of the label and extending to the upper part of the step difference compensation tape; attaching the external film to the battery cell to allow the label to be brought into contact with a case of the battery cell; and removing the protective film from the label.

The protective film may include a first protective film located on a surface of the label where the step difference compensation tape is not positioned, the first protective film having the same height as the step difference compensation tape, and a second protective film located on the first protective film and extending to the upper part of the step difference compensation tape.

The label may be attached to the case through a first adhesive, the first protective film may be attached to the label through a second adhesive having a smaller adhesion force than the first adhesive, a portion of the second protective film may be attached to the first protective film through a third adhesive having a larger adhesion force than the second adhesive, and the other portion of the second protective film may be attached to the step difference compensation tape through the second adhesive After the step of removing the protective film, the label attaching method may further include a step of attaching an external cover having a circuit structure embedded at a portion inside the external cover to the battery cell. Here, the external cover may be coupled to be mounted on the upper surface of the label, the circuit structure may be positioned next to the step difference compensation tape, and the circuit structure and the step difference compensation tape may have the same height.

Advantageous Effects of Disclosure

As described above, the battery pack according to an embodiment includes an external film including a label and a protective film detachably installed on the label and is configured to attach the label of a thin film type to the battery cell by attaching the external film to the battery cell and then removing the protective film, thereby easily attaching the thin label to the battery cell.

BEST MODE

Embodiments of the present disclosure are provided to more fully describe the present disclosure to those skilled in the art, and the following embodiments may be embodied in many different forms and should not be construed as being limited to the example embodiments set forth herein. Rather, these example embodiments are provided so that this disclosure will be thorough and complete and will convey the aspects and features of the present disclosure to those skilled in the art.

In addition, spatially relative terms, such as "beneath," "below," "lower," "above," "upper," and the like, may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if the secondary battery in the figures is turned over, elements described as "below" or "beneath" other elements or features would then be oriented "on" or "above" the other elements or features. Thus, the term "below" can encompass both an orientation of above and below.

In addition, in the accompanying drawings, thicknesses or sizes of various components are exaggerated for brevity and clarity. Like numbers refer to like elements throughout. As used herein, the term "and/or" includes any and all combinations of one or more of the associated listed items.

Figure 1:
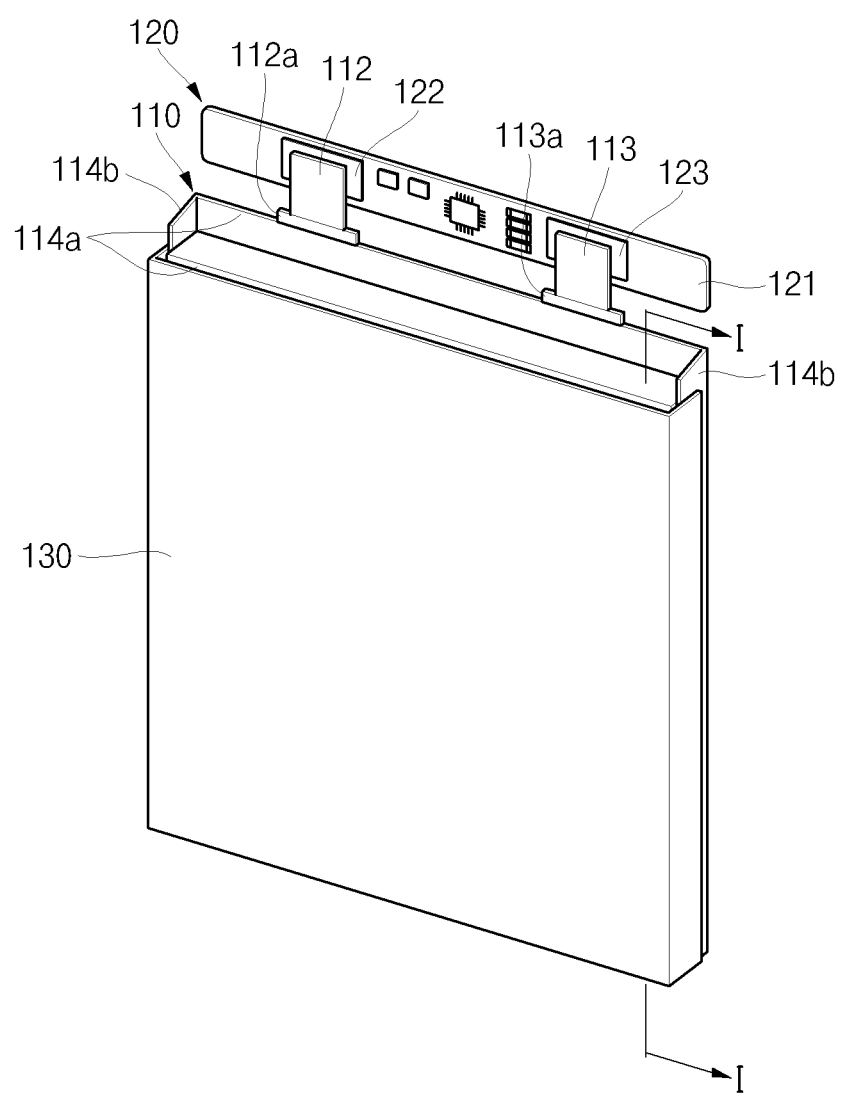
FIG. 1 is a perspective view of a battery pack according to an embodiment of the present disclosure.
Figure 2A:
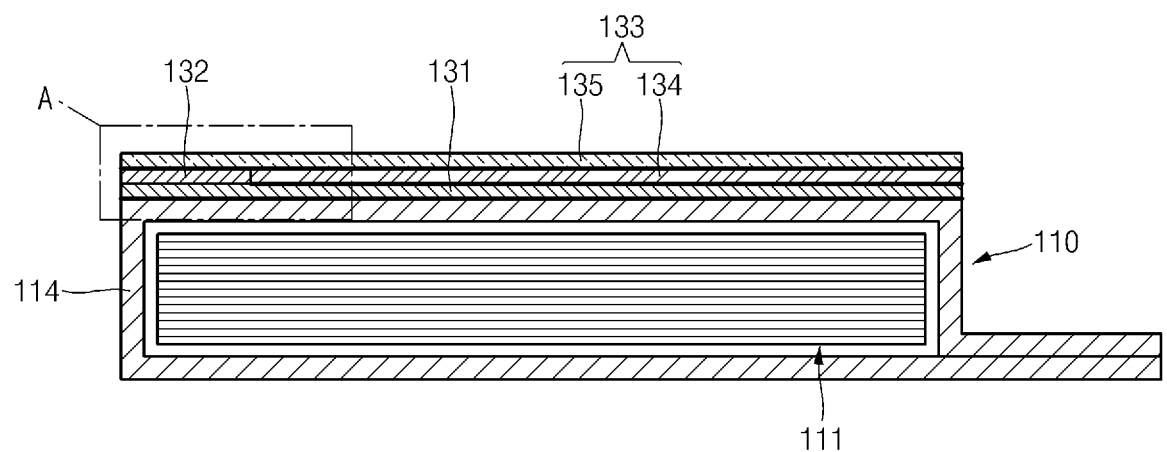
FIG. 2A is a cross-sectional view taken along the line I-I of FIG. 1.
Figure 3A:
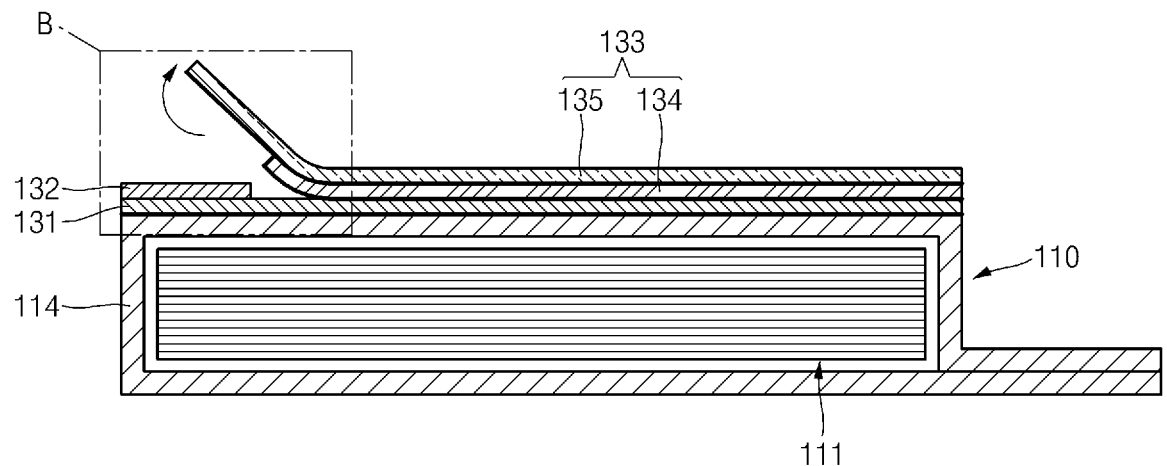
FIG. 3A is a cross-sectional view illustrating a method of removing a protective film from an external film.
Figure 3B:
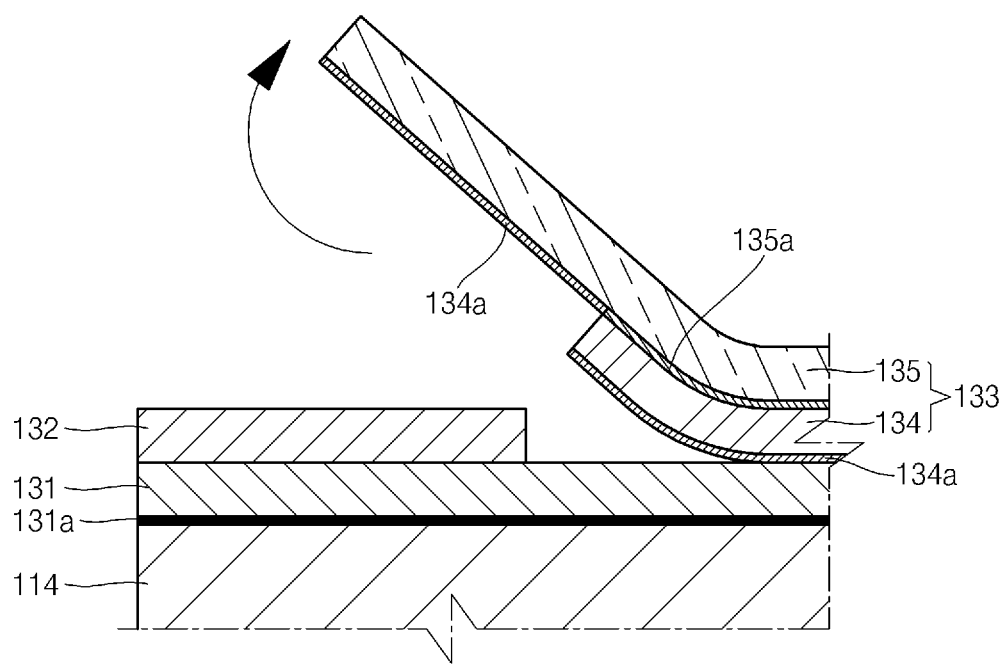
FIG. 3B is an enlarged cross-sectional view of a portion B of FIG. 3A.
Figure 4A:
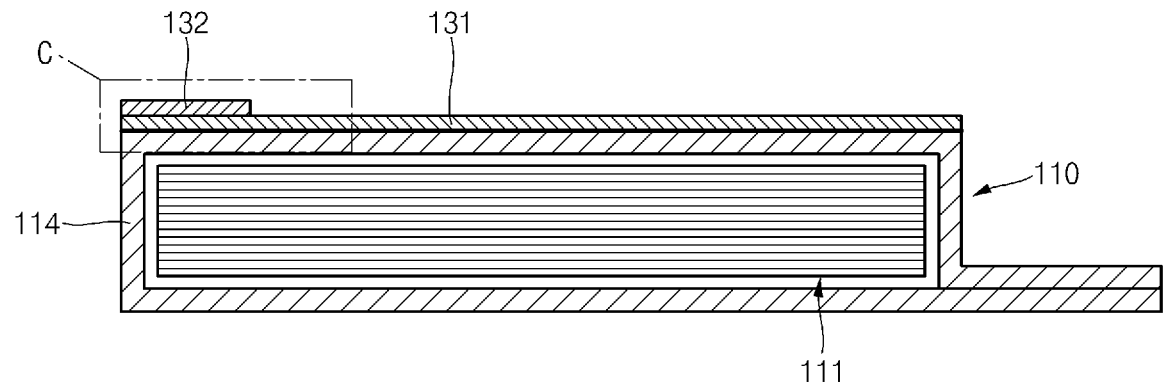
FIG. 4A is a cross-sectional view illustrating a state in which a protective film is removed from an external film.
Figure 4B:
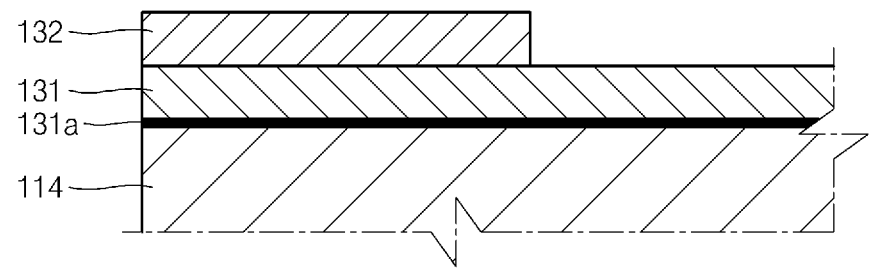
FIG. 4B is an enlarged cross-sectional view of a portion C of FIG. 4A.
Figure 5:
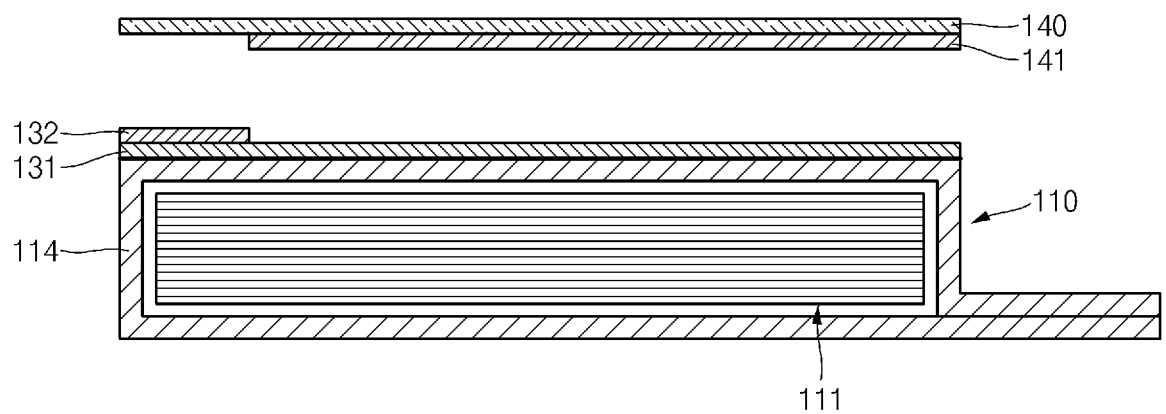
FIG. 5 is a cross-sectional view illustrating a state in which an external film is attached to a battery pack according to an embodiment of the present disclosure.

FIG. 1 is a perspective view of a battery pack according to an embodiment of the present disclosure. FIG. 2A is a cross-sectional view taken along the line I-I of FIG. 1, and FIG. 2A is an enlarged cross-sectional view of a portion A of FIG. 2A. FIG. 3A is a cross-sectional view illustrating a method of removing a protective film from an external film, and FIG. 3B is an enlarged cross-sectional view of a portion B of FIG. 3A. FIG. 4A is a cross-sectional view illustrating a state in which a protective film is removed from an external film, and FIG. 4B is an enlarged cross-sectional view of a portion C of FIG. 4A. FIG. 5 is a cross-sectional view illustrating a state in which an external film is attached to a battery pack according to an embodiment of the present disclosure.

Referring to FIG. 1, the battery pack 100 according to an embodiment of the present disclosure includes a battery cell 110, a protective circuit module 120 and an external film 130.

The battery cell 110 includes an electrode assembly 111 and a case 114 accommodating the electrode assembly 111. The electrode assembly 111 is prepared by winding or stacking a stack of a first electrode plate, a separator and a second electrode plate. Here, the first electrode plate may function as a positive electrode, and the second electrode plate may function as a negative electrode. Of course, polarities of the first electrode plate and the second electrode plate may be reversed and arranged according to the option made by a person skilled in the art.

The first electrode plate is prepared by applying a first electrode active material such as a transition metal oxide on a first electrode collector made of a metal foil such as aluminum foil, and includes a first electrode uncoated portion on which the first electrode active metal is not applied. In addition, a first electrode tab 112 is attached to the first electrode uncoated portion. The first electrode tab 112 may be attached to the first electrode uncoated portion by, for example, welding. One end of the first electrode tab 112 is electrically connected to the first electrode plate and the other end of the first electrode tab 112 is extended and protruded to the exterior side of the case 114.

The second electrode plate is prepared by applying a second electrode active material such as graphite or carbon on a second electrode collector made of a metal foil such as copper or nickel foil, and includes a second electrode uncoated portion on which the second electrode active metal is not applied. In addition, a second electrode tab 113 is attached to the second electrode uncoated portion. The second electrode tab 113 may be attached to the second electrode uncoated portion by, for example, welding. One end of the second electrode tab 113 is electrically connected to the second electrode plate and the other end of the second electrode tab 113 is extended and protruded to the exterior side of the case 114.

Here, the first electrode tab 112 and the second electrode tab 113 are covered by insulation members 112a and 113a, and thus are not electrically shorted to the case 114.

The separator, which is positioned between the first electrode plate and the second electrode plate, prevents a short circuit from occurring therebetween and allow lithium ions to move. The separator may be made of polyethylene, polypropylene, or a composite film of polypropylene and polyethylene.

The case 114 accommodates the electrode assembly 111. For example, the case 114 may have a pouch type configuration so as to receive the electrode assembly 111 to then be sealed. The case 114 has a pair of long side surfaces 114a and a pair of short side surfaces 114b. Here, the pair of long side surfaces 114a refer to surfaces having larger areas than the pair of short side surfaces 114b. The first and second electrode tabs 112 and 113 of the electrode assembly 111 are drawn out through one side of the case 114. Here, the insulation members 112a and 113a located on the first and second electrode tabs 112 and 113 are sealed with the one side of the case 114. That is to say, the insulation members 112a and 113a are located on contact portions between the first and second electrode tabs 112 and 113 and the case 114, thereby preventing the first and second electrode tabs 112 and 113 from being electrically shorted to the case 114.

Figure 6:
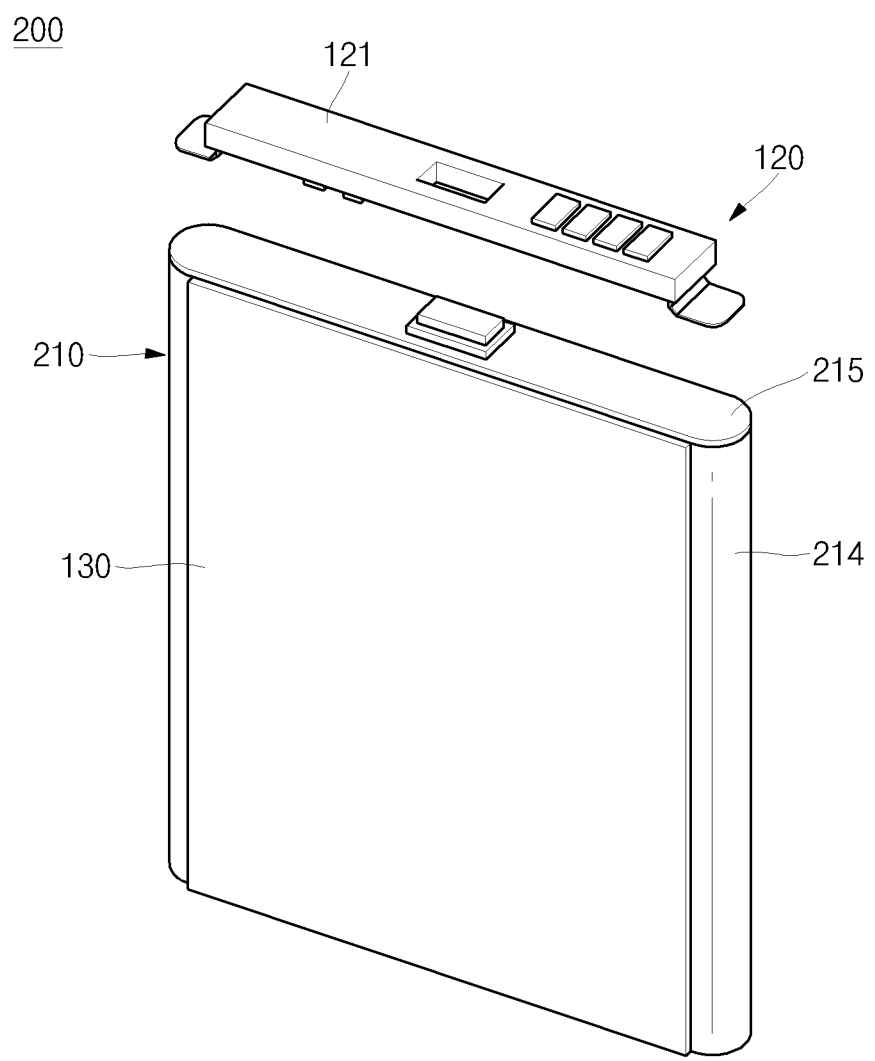
FIG. 6 is a perspective view of a battery pack according to another embodiment of the present disclosure.

In addition, the case 114 may have a pouch configuration, and may be formed of a can made of a metal, as shown in FIG. 6.

The protective circuit module 120 is electrically connected to the battery cell 110 and controls charging/discharging of the battery cell 110. The protective circuit module 120 includes a circuit board 121 and a plurality of devices located in the circuit board 121. The circuit board 121 is made of a resin and is shaped of a substantially planar rectangular plate. For example, the circuit board 121 may be a printed circuit board (PCB). In addition, the circuit board 121 may include a circuit for controlling charging/discharging of the battery cell 110 or a protective circuit, such as a circuit for preventing the battery cell 110 from being overdischarged or overcharged. A first electrode terminal 122 and a second electrode terminal 123 coupled to the first and second electrode tabs 112 and 113 of the battery cell 110 are located on one surface of the circuit board 121. Specifically, the first electrode tab 112 is electrically connected to the first electrode terminal 122 by welding, and the second electrode tab 113 is electrically connected to the second electrode terminal 123 by welding.

The external film 130 is attached to the surface of the battery cell 110. The external film 130 is attached to the case 114 of the battery cell 110 so as to cover at least one surface of the case 114. For example, the external film 130 may be attached to cover one of the pair of long side surfaces 114a and the pair of short side surfaces 114b of the case 114. In addition, the external film 130 may be attached to cover only one of the pair of long side surfaces 114a and one of the pair of short side surfaces 114b or to cover both of the pair of long side surfaces 114a and both of the pair of short side surfaces 114b.

Figure 2B:
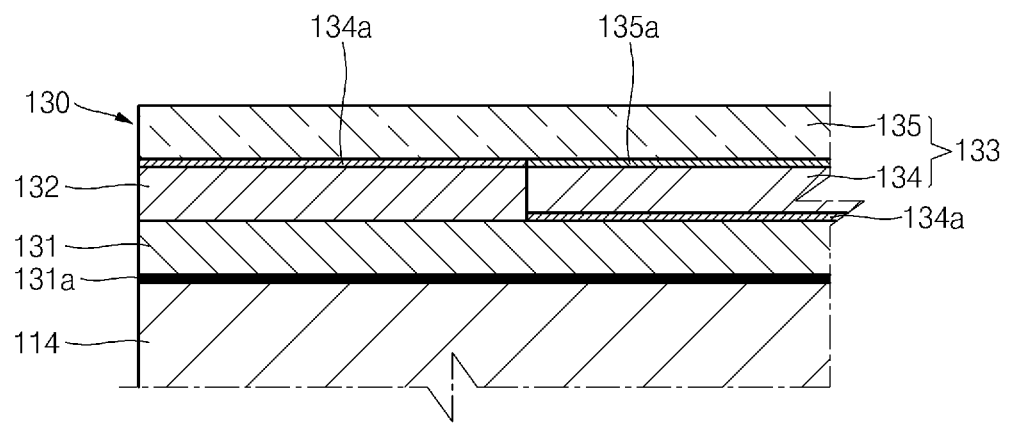
FIG. 2B is an enlarged cross-sectional view of a portion A of FIG. 2A.

Referring to FIGS. 2A and 2B, the external film 130 includes a label 131, a step difference compensation tape 132 and a protective film 133.

The label 131 is directly attached to a surface of the case 114 and includes various pieces of information about the battery pack 100 printed thereon. The label 131 is shaped of a thin film to prevent the thickness of the battery pack 100 from increasing. For example, the label 131 may have a thickness in a range of 0.01 mm to 0.05 mm. if the thickness of the label 131 is smaller than 0.01 mm, the label 131 may be too thin to print the information about the battery pack 100 thereon, and if the thickness of the label 131 is larger than 0.05 mm, the battery pack 100 may become unnecessarily thick.

In addition, the label 131 may be made of a polymer resin such as polyethylene (PE), polypropylene (PP), or polyethylene terephthalate (PET). A first adhesive 131a is located on one surface of the label 131, and the label 131 may be attached to the case 114 through the first adhesive 131a. Although the label 131 and the first adhesive 131a are shown as separate layers in the drawing, for the sake of explanation, the label 131 may be integrally formed with the first adhesive 131a. The first adhesive 131a may be a PET adhesive. The first adhesive 131a may have an adhesion force of about 600 g/f.

The step difference compensation tape 132 is attached to the upper surface of the label 131 and is positioned on one side of the label 131. The step difference compensation tape 132 may be an adhesive tape. Therefore, the step difference compensation tape 132 may be fixedly attached to the upper part of the label 131. The step difference compensation tape 132 may be made of a polymer resin such as polyethylene (PE), polypropylene (PP), or polyethylene terephthalate (PET). The step difference compensation tape 132 is provided for compensate for a step difference between the battery pack 100 and an external cover coupled to the battery pack 100. For example, as shown in FIG. 5, a circuit structure 141 such as an antenna may be embedded inside the external cover 140 coupled to the battery pack 100. The circuit structure 141 is installed only at a portion of the external cover 140, resulting in an empty space at the other portion where the circuit structure 141 is not located between the external cover 140 and the battery pack 100. Therefore, in the present disclosure, the step difference compensation tape 132 is provided on the label 131 to fill the empty space between the external cover 140 and the battery pack 100, thereby improving a coupling force between the battery pack 100 and the external cover 140. In addition, the step difference compensation tape 132 may have an area and a thickness set to vary according to the area and thickness of circuit structure 141 installed on the external cover 140.

In addition, the step difference compensation tape 132 may have an adhesion force equal to that of the first adhesive 131a allowing the label 131 to be attached to the case 114. Accordingly, the step difference compensation tape 132 still remains attached to the label 131 even when the protective film 133 of the external film 130 is removed from the label 131 and thus can compensate for a step difference between the battery pack 100 and the external cover 140.

The protective film 133 is attached onto the label 131 to cover the label 131 and the step difference compensation tape 132. The protective film 133 allows the label 131 in forms of a thin film to retain its shape. In other words, the label 131, which is relatively thin, is prone to defects such as curling or wrinkle, when the label 131 solely exists in a subsequent process. Therefore, in the present disclosure, the protective film 133 detachably attached to the label 131 is provided to facilitate handling of the label 131 and thus can reduce possible defects. In addition, the protective film 133 may have a larger area than the label 131 to be easily released from the label 131. Moreover, the protective film 133 may protect the information about the battery pack 100 printed on the label 131 from being erased.

The protective film 133 includes a first protective film 134 attached on the upper surface of the label 131, and a second protective film 135 attached to the upper surface of the first protective film 134.

The first protective film 134 is attached to the upper surface of the label 131 and is positioned next to the step difference compensation tape 132. That is to say, the first protective film 134 is attached to a portion of the label 131 where the step difference compensation tape 132 is not positioned. The first protective film 134 may have the same thickness as the step difference compensation tape 132. The first protective film 134 may be made of a polymer resin such as polyethylene (PE), polypropylene (PP), or polyethylene terephthalate (PET). In addition, the first protective film 134 may also be referred to as a first mylar.

In addition, a second adhesive 134a is located on one surface of the first protective film 134. The first protective film 134 may be attached to the label 131 through the second adhesive 134a. Although the first protective film 134 and the second adhesive 134a are shown as separate layers in the drawing, for the sake of explanation, the first protective film 134 may be integrally formed with the second adhesive 134a. The second adhesive 134a may be a silicon adhesive and thus allows the protective film 133 to be easily released from the label 131. The second adhesive 134a may have an adhesion force of about 10 to 30 g/f. The adhesion force of the second adhesive 134a is smaller than that of the first adhesive 131a. For example, the adhesion force of the second adhesive 134a is about 1/60 to 1/20 that of the first adhesive 131a. As such, the adhesion force of the second adhesive 134a located on the first protective film 134 is smaller than that of the first adhesive 131a located on the label 131, thereby allowing the protective film 133 to be easily released from the label 131.

The second protective film 135 is located on the upper surface of the first protective film 134 and has a larger area than the first protective film 134. In addition, the second protective film 135 extends from the upper surface of the first protective film 134 to the upper surface of the step difference compensation tape 132 so as to cover the first protective film 133 and the step difference compensation tape 132. The second protective film 135 may be made of a polymer resin such as polyethylene (PE), polypropylene (PP), or polyethylene terephthalate (PET). In addition, the second protective film 135 may also be referred to as a second mylar.

In addition, a second adhesive 134a and a third adhesive 135a are located on one surface of the second protective film 135. The second protective film 135 may be attached to the step difference compensation tape 132 and the first protective film 134 through the second and third adhesives 134a and 135a. Although the second protective film 135, the second and third adhesives 134a and 135a are shown as separate layers in the drawing, for the sake of explanation, the second protective film 135 may be integrally formed with the second and third adhesives 134a and 135a. Specifically, the second adhesive 134a may be provided between the step difference compensation tape 132 and the second protective film 135, and the third adhesive 135a may be provided between the first protective film 134 and the second protective film 135. The second adhesive 134a may be a silicon adhesive and thus allows the second protective film 135 to be easily released from the step difference compensation tape 132. The second adhesive 134a may have an adhesion force of about 10 to 30 g/f. The adhesion force of the second adhesive 134a is smaller than that of the step difference compensation tape 132. Accordingly, the step difference compensation tape 132 still remains attached to the label 131 when the protective film 133 is removed from the label 131, and only the second protective film 135 positioned on the step difference compensation tape 132 is removed. The third adhesive 135a may have a larger adhesion force than the second adhesive 134a. In detail, the third adhesive 135a may be made of the same material as the first adhesive 131a and may be a PET adhesive. The third adhesive 135a may have an adhesion force of about 600 g/f. As such, the third adhesive 135a allows the second protective film 135 and the first protective film 134 to be firmly attached to each other. Accordingly, when the protective film 133 is removed from the label 131, the first protective film 134 and the label 131 attached to each other with a relatively small adhesion force are separated from each other while the first protective film 134 and the second protective film 135 are not separated from each other.

A method of attaching an external film to a battery cell will be briefly described with reference to FIGS. 2A to 4B.

First, as shown in FIGS. 2A and 2B, an external film 130 including a label 131, a step difference compensation tape 132, a first protective film 134 and a second protective film 135 is attached to a battery cell 110. Here, the external film 130 is attached to the battery cell 110 such that the label 131 and the step difference compensation tape 132 are brought into contact with a case 114 of the battery cell 110. Then, as shown in FIGS. 3A and 3B, if one end of the second protective film 135 is upwardly lifted, the second protective film 135 and the step difference compensation tape 132, which are attached to each other through the second adhesive 134a having a relatively small adhesion force, are readily separated from each other, and the same applies to the first protective film 134 and the label 131 attached to each other through the second adhesive 134a. Therefore, as shown in FIGS. 4A and 4B, the protective film 133 is removed from the label 131, and only the label 131 and the step difference compensation tape 132 are left on the external surface of the battery cell 110. Here, the step difference compensation tape 132 remains protruding from the label 131. The step difference compensation tape 132 may fill up an empty space between an external cover 140 and a battery pack 100 when the external cover 140 having a circuit structure 141, e.g., an antenna, embedded therein is combined with the battery pack 100, as shown in FIG. 5. Therefore, the step difference compensation tape 132 may increase a coupling force between the battery pack 100 and the external cover 140.

As described above, the battery pack 100 according to an embodiment includes the external film 130 including the label 131 and the protective film 133 detachably installed on the label 131 and is configured to attach the label 131 of a thin film type to the battery cell 110 by attaching the external film 130 to the battery cell 110 and then removing the protective film 133. That is to say, the battery pack 100 according to an embodiment includes the detachable protective film 133, thereby easily attaching the thin label 131 to the battery cell 110 without increasing the thickness of the battery pack 100.

FIG. 6 is a perspective view of a battery pack according to another embodiment of the present disclosure.

Referring to FIG. 6, the battery pack 200 according to another embodiment includes a battery cell 210, a protective circuit module 120 and an external film 130. The battery pack 200 shown in FIG. 6 differs from the battery pack 100 shown in FIG. 1 only in view of the shape of battery cell.

The battery cell 210 includes an electrode assembly, a case 214 accommodating the electrode assembly, and a cap plate 215 coupled to an upper surface of the case 214. Here, the case 214 may have a configuration of a can made of a metal, instead of a pouch type configuration. In addition, a protective circuit module 120 is mounted on the cap plate 215, and an external film 130 is attached to either of a pair of long side surfaces of the can 214. Although the external film 130 attached to only either of the pair of long side surfaces of the can 214 is shown in the drawing, the external film 130 may extend to opposite short side surfaces as well as the long side surface of the can 214, and may be attached to cover all external surfaces of the can 214. In addition, since the external film 130 has the same shape as described above, a detailed description thereof will not be given.

While the foregoing embodiment has been described to practice the battery pack of the present disclosure and the label film attaching method thereof, it will be understood by those of ordinary skill in the art that various changes in form and details may be made therein without departing from the spirit and scope of the present disclosure as defined by the following claims.

The invention claimed is:
1. A battery pack comprising:
a battery cell having an electrode assembly accommodated in a case;
an external film, which has a label attached to at least one surface of the case and directly attached to the case, and a step difference compensation tape attached to an outer surface of the label and positioned on one side of the label; and an external cover coupled to the battery cell and having a circuit structure embedded at a portion inside the external cover, wherein:

the external cover is on the outer surface of the label, the circuit structure is laterally adjacent to the step difference compensation tape, and the circuit structure and the step difference compensation tape have a same height such that the battery cell has a flat outer surface.

2. A label attaching method of a battery cell, comprising the steps of:

preparing an external film having a label, a step difference compensation tape attached to an outer surface of the label and positioned on one side of the label, and a protective film attached to the outer surface of the label and extending onto an outer surface of the step difference compensation tape;

attaching the external film to the battery cell such that the label contacts and is coupled with a case of the battery cell;

removing the protective film from the label; and attaching an external cover having a circuit structure embedded at a portion inside the external cover to the battery cell, wherein:

the external cover is coupled to the outer surface of the label, the circuit structure is laterally adjacent to the step difference compensation tape, and the circuit structure and the step difference compensation tape have the same height such that the battery cell has a flat outer surface.

3. The label attaching method according to claim 2, wherein the protective film comprises:

a first protective film located on a surface of the label where the step difference compensation tape is not positioned such that the first protective film does not overlap the step difference compensation tape, the first protective film having the same height as the step difference compensation tape, and a second protective film located on the first protective film and extending onto the outer surface of the step difference compensation tape.

4. The label attaching method according to claim 3, wherein:

the label is attached to the case through a first adhesive, the first protective film is attached to the label through a second adhesive having a smaller adhesion force than the first adhesive, one portion of the second protective film is attached to the first protective film through a third adhesive having a larger adhesion force than the second adhesive, and another portion of the second protective film is attached to the step difference compensation tape through the second adhesive.

* * * * *